United States Patent
Yokoyama et al.

(10) Patent No.: US 10,145,267 B2
(45) Date of Patent: Dec. 4, 2018

(54) TURBINE HOUSING

(71) Applicant: MITSUBISHI HEAVY INDUSTRIES ENGINE & TURBOCHARGER LTD., Sagamihara-shi (JP)

(72) Inventors: Takao Yokoyama, Tokyo (JP); Yoji Akiyama, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 206 days.

(21) Appl. No.: 15/039,957

(22) PCT Filed: Dec. 27, 2013

(86) PCT No.: PCT/JP2013/085143
§ 371 (c)(1),
(2) Date: May 27, 2016

(87) PCT Pub. No.: WO2015/097872
PCT Pub. Date: Jul. 2, 2015

(65) Prior Publication Data
US 2016/0290163 A1  Oct. 6, 2016

(51) Int. Cl.
*F01D 25/24* (2006.01)
*F02B 39/00* (2006.01)
(Continued)

(52) U.S. Cl.
CPC ............. *F01D 25/24* (2013.01); *F01D 9/026* (2013.01); *F01D 25/26* (2013.01); *F02B 37/02* (2013.01);
(Continued)

(58) Field of Classification Search
CPC .......... F01D 9/026; F01D 25/24; F01D 25/26; F02B 37/02; F02B 37/025; F02B 39/00;
(Continued)

(56) References Cited

U.S. PATENT DOCUMENTS 6,209,884 B1 * 4/2001 Taudt ............... F16J 15/0887
277/607
2005/0019158 A1 * 1/2005 Claus ................. F01D 9/026
415/204
(Continued)

FOREIGN PATENT DOCUMENTS

DE   10 2009 015 353 A1   9/2010
DE   10 2009 058 534 A1   6/2011
(Continued)

OTHER PUBLICATIONS

International Preliminary Report on Patentability and Written Opinion of the International Searching Authority (Forms PCT/IB/338, PCT/IB/373, PCT/ISA/237 and PCT/IB/326), dated Jul. 7, 2016, for International Application No. PCT/JP2013/085143, with English translation.
(Continued)

*Primary Examiner* — Igor Kershteyn
(74) *Attorney, Agent, or Firm* — Birch, Stewart, Kolasch & Birch, LLP (57) ABSTRACT

An object is to reduce loss of exhaust gas by improving a surface roughness to enhance efficiency of a turbocharger and to reduce generation of a crack due to thermal fatigue to improve durability, as well as to ensure rigidity to prevent exhaust-gas leakage to outside. A turbine housing accommodates a turbine wheel rotated by exhaust gas taken in from an engine and includes a scroll part having a scroll shape and forming, on a radially-inner side, an exhaust-gas flow passage. The turbine housing includes: a casted exterior member forming an opening portion accommodating a back-face member attachable and detachable in an axial direction of the turbine wheel; and a sheet-metal interior member disposed inside the exterior member via a predetermined clearance part from the exterior member and forming the
(Continued)

scroll part. The interior member is configured to be attachable and detachable with respect to the exterior member through the opening portion.

9 Claims, 4 Drawing Sheets

(51) Int. Cl.
- *F02B 37/02* (2006.01)
- *F02B 39/16* (2006.01)
- *F01D 9/02* (2006.01)
- *F01D 25/26* (2006.01)

(52) U.S. Cl.
CPC ............ *F02B 37/025* (2013.01); *F02B 39/00* (2013.01); *F02B 39/16* (2013.01); *F05D 2220/40* (2013.01); *F05D 2230/54* (2013.01); *F05D 2240/15* (2013.01); *F05D 2260/941* (2013.01); *Y02T 10/144* (2013.01)

(58) Field of Classification Search
CPC .. F02B 39/16; F05D 2220/40; F05D 2230/54; F05D 2240/15; F05D 2260/941; Y02T 10/144
See application file for complete search history.

(56) References Cited

U.S. PATENT DOCUMENTS

| | | | |
|---|---|---|---|
| 2009/0317247 A1* | 12/2009 | Hoecker | F01D 9/04 415/213.1 |
| 2011/0182722 A1 | 7/2011 | Matsuyama | |
| 2011/0236191 A1* | 9/2011 | Grussmann | F01D 25/243 415/177 |
| 2011/0252775 A1* | 10/2011 | Joergl | F01D 25/145 60/321 |
| 2011/0286837 A1* | 11/2011 | Smatloch | F01D 25/243 415/170.1 |
| 2012/0023928 A1* | 2/2012 | Smatloch | F01D 9/026 60/598 |
| 2012/0102737 A1* | 5/2012 | Smatloch | B23P 15/00 29/888.02 |
| 2012/0263585 A1* | 10/2012 | Matsuyama | F16J 15/0887 415/204 |

FOREIGN PATENT DOCUMENTS

| | | |
|---|---|---|
| JP | 61-218733 A | 9/1986 |
| JP | 62-29724 A | 2/1987 |
| JP | 63-111234 A | 5/1988 |
| JP | 63-111238 A | 5/1988 |
| JP | 1-95536 U | 6/1989 |
| JP | 7-139364 A | 5/1995 |
| JP | 2003-536009 A | 12/2003 |
| JP | 2006-132386 A | 5/2006 |
| JP | 2006-161573 A | 6/2006 |
| JP | 2008-57448 A | 3/2008 |
| JP | 2009-47027 A | 3/2009 |
| WO | WO 2010/039590 A2 | 4/2010 |

OTHER PUBLICATIONS

International Search Report and Written Opinion of the International Searching Authority (Forms PCT/ISA/210, PCT/ISA/220 and PCT/ISA/237), dated Mar. 4, 2014, for International Application No. PCT/JP2013/085143.

Extended European Search Report effective Nov. 25, 2016 issued in the corresponding EP Application No. 13900483.2.

\* cited by examiner

TURBINE HOUSING

TECHNICAL FIELD

The present invention relates to a turbine housing of a turbocharger which generates a boost pressure for an engine by utilizing energy of exhaust gas taken in from the engine.

BACKGROUND ART

A conventionally-known turbocharger rotates a turbine wheel by utilizing energy of exhaust gas taken in from an engine and rotates a compressor wheel disposed coaxially with the turbine wheel to supply an intake manifold with pressurized air, thereby improving an output. If such a turbocharger is to be mounted to a vehicle, efficiency of the turbocharger may affect fuel consumption of an engine. Thus, to improve fuel efficiency in particular, weight reduction, cost reduction, facilitated fabrication, and heat-capacity reduction are required.

Recently, an air-fuel ratio of an engine of an automobile is brought closer to a stoichiometry to reduce fuel consumption, and thus an exhaust-gas temperature tends to increase. Thus, for a common casted turbine housing, expensive materials such as austenite stainless cast steel, which has a high heat-resistance property and a high abrasion-resistance property, for instance, are used to resist high-temperature exhaust gas. Further, a casted turbine housing has a rough surface roughness on an inner wall surface of a housing. Thus, machining is required to make up for the insufficient accuracy of casted parts to prevent an increase in loss of exhaust gas flowing through an exhaust-gas passage in the housing and an accompanying decrease in efficiency of a turbocharger. Accordingly, such a casted turbine housing may increase material cost and production cost, for instance, and discourage cost reduction of a turbocharger. Thus, a sheet-metal turbine housing tends to be employed instead of a casted turbine housing.

As an example of a sheet-metal turbine housing, for instance, Patent Document 1 discloses a turbine housing including a scroll part with an exhaust gas passage of a scroll shape formed inside, the scroll part being formed by butting halved sheet-metal members each having a plate shape or a bowl shape and welding the sheet-metal members in a circumferential direction (see FIG. 3 of Patent Document 1). Further, Patent Document 2 also discloses a turbine housing including a scroll part formed by butting two right-and-left halved sheet-metal members and welding the sheet-metal members in a circumferential direction (see FIG. 2 of Patent Document 2). Further, Patent Document 3 discloses a turbine housing including a sheet-metal scroll member with an exhaust-gas passage of a scroll shape formed inside, and a sheet-metal cover member surrounding the outer periphery of the scroll member (see FIG. 4 of Patent Document 3).

Further, Patent Document 4 discloses a casted turbine housing with a sheet-metal inner peripheral surface formed inside during casting of the turbine housing (see FIGS. 1 and 2). Patent Document 5 discloses a turbine housing including a casted turbine casing with a ceramic scroll part formed inside during casting of the turbine casing (see FIG. 1).

CITATION LIST

Patent Literature

Patent Document 1: JP2008-57448A
Patent Document 2: JP2003-536009A (translation of a PCT application)
Patent Document 3: JP2006-161573A
Patent Document 4: JPS63-111234A
Patent Document 5: JPS62-29724A

SUMMARY

Problems to be Solved

However, in the sheet-metal turbine housing disclosed in Patent Document 1, a throat-portion region being a scroll-end of the scroll part formed by butting halved sheet-metal members is exposed to rapid and repetitive heating and cooling. In addition, the strength of the throat-portion region is reduced due to welding at the butting part, which in combination raises the risk of generation of a crack or the like due to thermal stress, which may eventually bring about leakage of exhaust gas through the crack.

Further, also in Patent Document 2, the scroll part is formed by butting halved sheet-metal members. Thus, as described with reference to Patent Document 1, a crack or the like may be produced in a throat-portion region due to thermal stress, and fluid (exhaust gas) leakage is likely to take place accompanying the crack or the like.

Thus, in Patent Document 3, the scroll part of the turbine housing has a dual structure of a scroll member and a cover member to increase rigidity of the turbine housing. Thus, generation of a crack or the like due to thermal stress is prevented, and a shielding property (containment property) to prevent a damaged internal part from falling out is ensured. However, now that the scroll part has a dual structure, increased weight may bring about a temperature difference between interior and exterior members to promote thermal deformation, which may lead to a disadvantage of not being capable of sufficiently reducing weight and heat capacity of the turbine housing.

In contrast, the above problems are addressed in Patent Documents 4 and 5 by composing a turbine housing of a casted exterior part and a sheet-metal or ceramic interior part. However, the interior part needs to be installed inside the exterior part while the exterior part is being casted, which brings about the problem of more complicated fabrication. Further, an adiabatic member is to be disposed between the exterior part and the interior part, and thus the number of members and cost may increase, which is another disadvantage.

Accordingly, the present invention was made in view of the above problems, and an object of the present invention is to provide a turbine housing capable of reducing loss of exhaust gas with an improved surface roughness to improve efficiency of a turbocharger, and of reducing generation of a crack due to thermal fatigue to improve durability, the turbine housing also being easily obtainable and capable of preventing exhaust-gas leakage to outside securely with ensured rigidity.

Solution to the Problems

To achieve the above object, a turbine housing according to the present invention accommodates a turbine wheel rotated by exhaust gas taken in from an engine, includes a scroll part having a scroll shape and forming, on a radially-inner side, a flow passage for the exhaust gas, and comprises: an exterior member formed by casting, the exterior member forming an opening portion inside which a back-face member is disposed so as to have a gap from a back-face side of the turbine wheel; and an interior member made of sheet metal, the interior member being disposed inside the exterior member via a predetermined clearance part from the exterior member and forming the scroll part. The interior member is configured to be attachable and detachable with respect to the exterior member through the opening portion.

According to the above invention, the turbine housing accommodating the turbine wheel to be rotated by exhaust gas taken in from the engine and including the scroll part of a scroll shape configured to form a swirl flow of the exhaust gas inside, has a double structure including the exterior member formed by casting and the interior member made of sheet metal, which makes it possible to ensure rigidity of the turbocharger.

Further, with the interior member being composed of sheet metal, it is possible to obtain an exhaust gas passage with an improved surface roughness, which makes it possible to reduce loss of exhaust gas flowing through the exhaust gas passage to improve efficiency of the turbocharger. Also, the interior member does not have a halved structure, which makes it possible to reduce incidence of a crack due to thermal fatigue and to improve durability.

At this time, since the exterior member is formed by casting and has clearance interposed between the exterior member and the interior member, it is possible to permit exhaust-gas leakage from the interior member and to prevent outflow securely with the exterior member.

Further, the interior member is attachable and detachable with respect to the exterior member via the opening portion where the back-face member is disposed removably in the axial direction of the turbine wheel, which makes it possible to facilitate fabrication.

In the above configuration, the interior member may include a first engaging portion to be engaged with an opening edge of the opening portion, and a second engaging portion to be engaged with an edge portion of an inner cylinder portion forming an inner peripheral part of the exterior member.

Accordingly, it is possible to mount the interior member stably inside the exterior member.

Further, preferably in the present invention, the interior member may be mounted inside the exterior member via a fastening member.

Accordingly, with the interior member being mounted inside the exterior member via the fastening member, it is possible to fix the interior member to the exterior member securely with a simple configuration.

Further, preferably in the present invention, the interior member is bended into a predetermined shape. Further, the interior member is configured to be fitted inside the exterior member by a spring-back effect to deform the interior member by a bending stress applied radially inward and bias the interior member outward by a reaction force generated by removal of the bending stress during attachment and detachment of the interior member with respect to the exterior member.

With the above turbocharger, the interior member is formed into a predetermined shape by bending, and fitted inside the exterior member by a so-called spring-back effect. Thus, a fastening member for fixing is no longer required and it is possible to reduce the number of constituent parts, and to reduce cost. Alternatively, a fastening member may be used in combination, which makes it possible to significantly improve mounting reliability of the interior member with respect to the exterior member.

Further, preferably in the present invention, the interior member comprises an end portion disposed on an opening-portion side of the exterior member, the first end portion being interposed between the back-face member and the exterior member.

Accordingly, the first end portion of the interior member, disposed on the side of the opening portion of the exterior member, is interposed between the back-face member and the exterior member. Thus, it is possible to mount the interior member to the exterior member without a fastening member, which makes it possible to reduce the number of constituent parts and to reduce cost. Alternatively, the above described fastening member and spring-back effect may be employed in combination, which makes it possible to mount the interior member even more securely to the exterior member and to improve the mounting reliability even further.

Further, preferably in the present invention, the interior member comprises the scroll part, and the scroll part is bended to have a plurality of flow passages for the exhaust gas, the flow passages being aligned in a direction of a rotational axis of the turbine wheel.

Accordingly, with the interior member including the scroll part bended to have the plurality of flow passages for exhaust gas it is possible to reduce incidence of a secondary flow in a swirl flow of exhaust gas in the scroll part, which makes it possible to improve performance of the turbocharger.

Further, with two flow passages for exhaust gas formed in the scroll part, it is possible to utilize the scroll part as a twin scroll.

Further, preferably in the present invention, the interior member includes a shroud part formed so as to surround a rim portion of the turbine wheel, the shroud part being formed integrally with the interior member and extending from the scroll part.

With the above turbocharger, the interior member is extended from the scroll part to form the shroud part formed so as to cover a rim portion of the turbine wheel, radially inside the turbine housing. Thus, the shroud part is also composed of sheet metal, and it is possible to restrict a temperature rise of the exterior member even further.

Further, normally, a certain clearance is required between the shroud part and the turbine wheel to reduce a risk of damage due to thermal deformation of a turbine blade part caused by high-temperature exhaust gas during an engine transient period. Conversely, in the above configuration, the shroud part can be formed of the interior member capable of following thermal deformation of the turbine blade part, and thus it is possible to reduce a risk of damage due to contact of the turbine blade part considerably, and to minimize the above described clearance, which makes it possible to eliminate space that is unnecessary during normal operation, thereby reducing the size of the turbine housing as a whole.

Further, preferably in the present invention, the interior member includes a first engaging portion to be engaged with an opening edge of the opening portion, and a third engaging portion to be engaged with an inner peripheral portion of an inner cylinder portion forming an inner peripheral part of the exterior member.

Accordingly, the interior member includes the first engaging portion to be engaged with the opening edge of the opening portion, and the third engaging portion to be engaged with the inner peripheral portion of the inner cylinder portion forming the inner peripheral part of the exterior member, which makes it possible to fix the interior member to the inner peripheral portion of the inner cylinder portion of the exterior member.

Further, preferably in the present invention, the exterior member is made of a material having lower heat resistance than the interior member.

For instance, the exterior member may be composed of ductile cast iron and the interior member may be composed of austenite stainless cast steel.

Further, with the turbine housing including the exterior member composed of ductile cast iron and the interior member composed of austenite stainless cast steel, the scroll part, which is to be exposed to high-temperature exhaust gas, can be composed of an expensive material with a higher heat-resistance property and a higher abrasion-resistance property, for instance, and the exterior member, which is to be disposed on the radially-outer side of the turbine housing, can be composed of a less expensive material that can resist at least heat from exhaust gas having leaked through the interior member or radiation heat from the interior member. Accordingly, it is possible to reduce a considerable usage amount of an expensive material with a high heat-resistance property and a high abrasion-resistance property, for instance, which makes it possible to reduce cost sufficiently.

Further, preferably in the present invention, the back-face member is made of sheet metal.

Accordingly, with the back-face member also being composed of sheet metal, it is possible to simplify fabrication, and to share parts with a turbocharger of different size and type to improve assembly performance, which makes it possible to reduce cost even further.

Advantageous Effects

According to the present embodiment, it is possible to improve a surface roughness and reduce loss of exhaust gas to improve efficiency of a turbocharger, and to reduce incidence of a crack due to thermal fatigue to improve durability, as well as to ensure rigidity to prevent exhaust-gas leakage to outside securely.

DETAILED DESCRIPTION

Embodiments of a turbocharger according to the present invention will now be described in detail with reference to the accompanying drawings.

It is intended, however, that unless particularly specified, dimensions, materials, shapes, relative positions and the like of components described in the embodiments shall be interpreted as illustrative only and not limitative of the scope of the present invention.

First Embodiment

Figure 1:
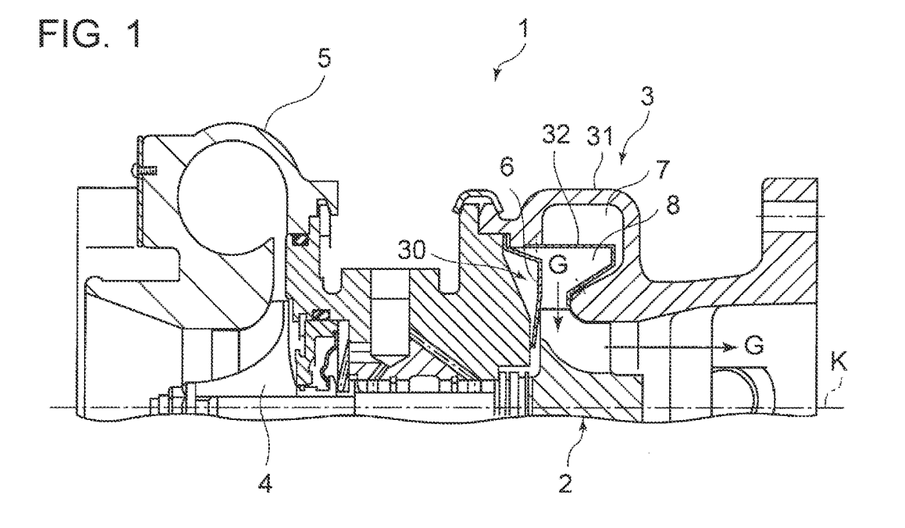
FIG. 1 is a cross-sectional view of a turbocharger according to the first embodiment of the present invention.
Figure 2:
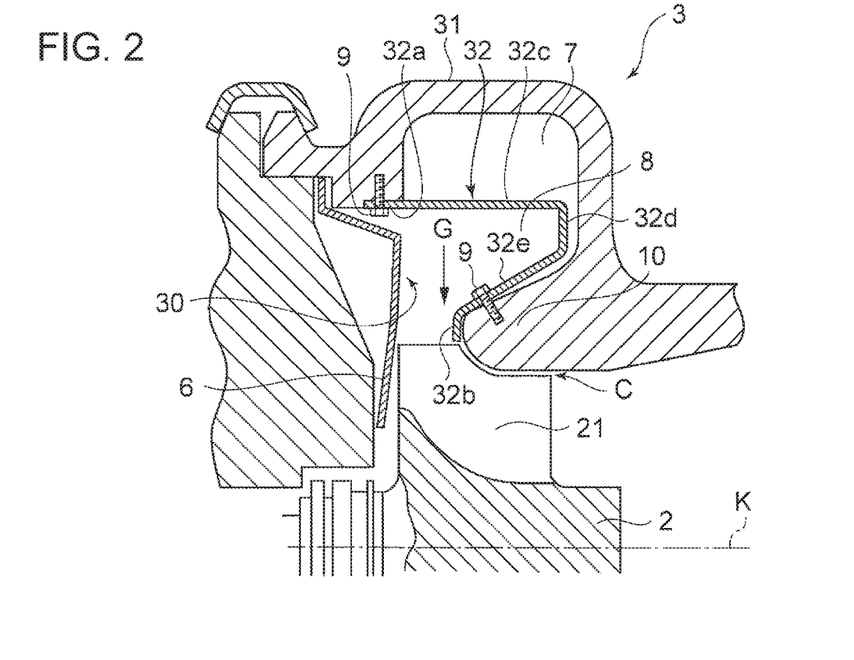
FIG. 2 is a partial enlarged view of FIG. 1.

As illustrated in FIGS. 1 and 2, the turbine housing 3 according to the first embodiment of the present invention is a turbine housing of an exhaust turbocharger 1 to be mounted to a diesel engine or a gasoline engine (not illustrated) to be mounted to an automobile, a track, a bus, a ship, or an industrial engine or the like (not illustrated).

The turbocharger 1 includes a turbine housing 3 which houses a turbine wheel 2 rotatably about a rotational axis K, the turbine wheel 2 being rotated by exhaust gas G taken in from the above engine. Further, the turbocharger 1 includes a compressor housing 5 housing a compressor impeller 4 rotatably, the compressor impeller 4 being disposed coaxially with the turbine wheel 2. The compressor housing 5 is configured such that air flows into the compressor housing 5 through an air cleaner (not illustrated), and the compressor impeller 4 is driven to rotate by the turbine wheel 2 to supercharge intake air to the engine.

Further, a branch channel branching midway is formed in an exhaust channel (not illustrated) connecting to the turbine wheel 2 of the turbocharger 1 from the engine. A waste-gate valve (not illustrated) is disposed in the branch channel so as to bypass the turbine wheel 2 to communicate with a downstream exhaust channel. It should be noted that, in the drawing, an arrow accompanying the exhaust gas G represents a flow of the exhaust gas G.

In the present embodiment, the turbine housing 3 housing the turbine wheel 2 as described above includes an exterior member 31 formed by casting so as to have an opening portion 30 for housing a back plate 6 being a back surface member which is disposed so as to have a gap on a back surface side of the turbine wheel 2 and which is attachable and detachable in the axial direction of the turbine wheel 2. Further, the turbine housing 3 includes an interior member 32 composed of sheet metal and disposed via a predetermined clearance part 7 inside the exterior member 31, the interior member 32 forming a scroll part 8 of a scroll shape that forms a flow path of exhaust gas G inside. The interior member 32 is attachable and detachable inside the exterior member 31 via the opening portion 30.

In other words, the turbine housing 3 has a dual structure including the exterior member 31 formed by casting and the interior member 32 composed of sheet metal, the interior member 32 being attachable and detachable with respect to the exterior member 31.

Specifically, the interior member 32 includes: the first end portion 32a being the first engaging portion to be engaged with an opening edge of the opening portion 30, the first end portion 32a being disposed on the side of the opening portion 30; and the second end portion 32b being the second engaging portion engaged with an edge portion of an inner cylinder portion forming an inner peripheral part of the exterior member 31, the second end portion 32b being disposed downstream the exhaust gas G (see FIG. 2).

Thus, it is possible to mount the interior member 32 stably inside the exterior member 31.

Further, the interior member 32 includes the first side 32c extending substantially parallel to the rotational axis K from the first end portion 32a, the second side 32d bended from the first side 32c substantially perpendicularly toward the turbine wheel 2 along the inner cylinder portion of the exterior member 31, and the third side 32e bended from the second side 32d so as to incline toward the opening portion 30 along the inner cylinder portion of the exterior member 31 (see FIG. 2).

The first end portion 32a and the second end portion 32b of the interior member 32 are mounted inside the exterior member 31 via bolt members 9, which are fastening members. As described above, with the interior member 32 being mounted inside the exterior member 31 by the bolts 9 at the first end portion 32a and the second end portion 32b, it is possible to securely fix the interior member 32 to the exterior member 31 with a simple configuration.

Further, a shroud part 10 forming an exhaust channel of exhaust gas G is formed on the inner peripheral part of the turbine housing 3 so as to surround the turbine wheel 2. Specifically, the shroud part 10 is formed proximate to a rim portion of a turbine blade part 21 of the turbine wheel 2 via a slight clearance C. Accordingly, high-temperature exhaust gas G discharged from a combustion chamber (not illustrated) of the engine is swirled in the scroll part 8 to rotate the turbine wheel 2, and thereby the shroud part 10, the interior member 32, and the turbine wheel 2 inside the turbine housing 3 are exposed to high-temperature exhaust gas G to undergo a temperature rise.

At this time, the exterior member 31 on a radially-outer side of the turbine housing 3 may be composed of a material with a lower heat-resistance property than the interior member, which is, for instance, ductile cast iron, and the interior member 32 on a radially-inner side of the turbine housing 3 may be composed of austenite stainless cast steel, for instance. In this way, it is possible to compose the interior member 32, which forms the scroll part 8 and is to be exposed to high-temperature exhaust gas, of an expensive material with a higher heat-resistance property and a higher abrasion-resistance property, for instance. Further, it is possible to compose the exterior member 31 of a less expensive material that can resist at least heat from exhaust gas having leaked at the side of the interior member 32 and radiation heat from the interior member. Thus, it is possible to reduce a considerable usage amount of an expensive material with a higher heat-resistance property and a higher abrasion-resistance property, for instance, which makes it possible to reduce cost sufficiently.

Further, the back plate 6 may be preferably formed of sheet metal. With the back plate 6 also being formed of sheet metal, it is possible to reduce cost as compared to a casted back plate, and to simplify fabrication. Further, it is possible to share parts with a turbocharger having a different turbine size or a different type of the scroll part 8 (single scroll, twin scroll, etc.), which makes it possible to reduce cost even further.

Further, the exterior member 31 may also be configured to be sharable, which makes it possible to reduce cost even more considerably by only changing the interior member 32 in accordance with the type of the scroll part 8.

As described above, according to the turbocharger of the first embodiment, the turbine housing 3 accommodating the turbine wheel 2 to be rotated by exhaust gas G taken in from an engine (not depicted) and including the scroll part 8 of a scroll shape configured to form a swirl flow of the exhaust gas G inside, has a double structure including the exterior member 31 formed by casting and the interior member 32 formed of sheet metal, which makes it possible to ensure rigidity of the turbocharger 1.

Further, with the interior member 32 being composed of sheet metal, it is possible to improve a surface roughness of the scroll part 8 serving as an exhaust-gas passage, which makes it possible to reduce loss of exhaust gas G flowing through the exhaust gas passage to improve efficiency of the turbocharger 1.

At this time, since the exterior member 31 is formed by casting and has a clearance part 7 interposed between the exterior member 31 and the interior member 32, it is possible to permit exhaust-gas leakage from the interior member 32 and to prevent outflow securely with the exterior member 31.

Further, the interior member 32 is attachable and detachable with respect to the exterior member 31 via the opening portion 30, which makes it possible to facilitate fabrication.

As described above, with the interior member 32 being mounted inside the exterior member 31 by the bolts 9, it is possible to fix the interior member 32 to the exterior member 31 securely with a simple configuration.

Further, with the exterior member 31, which constitutes the turbine housing 3, being composed of ductile cast iron and the interior member 32 being composed of austenite stainless cast steel, the scroll part 8, which is to be exposed to high-temperature exhaust gas G, can be composed of an expensive material with a higher heat-resistance property and a higher abrasion-resistance property, for instance, and the exterior member 31, which is to be disposed on the radially-outer side of the turbine housing 3, can be composed of a less expensive material that can resist at least heat from exhaust gas having leaked through the interior member 32 or radiation heat from the interior member 32. Accordingly, it is possible to reduce a considerable usage amount of an expensive material with a higher heat-resistance property and a higher abrasion-resistance property, for instance, which makes it possible to reduce cost sufficiently.

Further, the interior member 32 constituting the scroll part 8 is not divided in two, for instance, but is integrated into one piece. Thus, it is possible to reduce generation of a crack due to thermal fatigue and to improve durability. As a result, as compared to a conventional halved structure, it is possible to improve rigidity of the scroll part 8, and to ensure a high shielding (containment) property even if the interior member 32 is composed of sheet metal to have a small thickness.

Further, with the back plate 6 also being composed of sheet metal, it is possible to simplify fabrication, and to share parts with a turbocharger of different size and type to improve assembly performance, which makes it possible to reduce cost even further.

Second Embodiment

Figure 3:
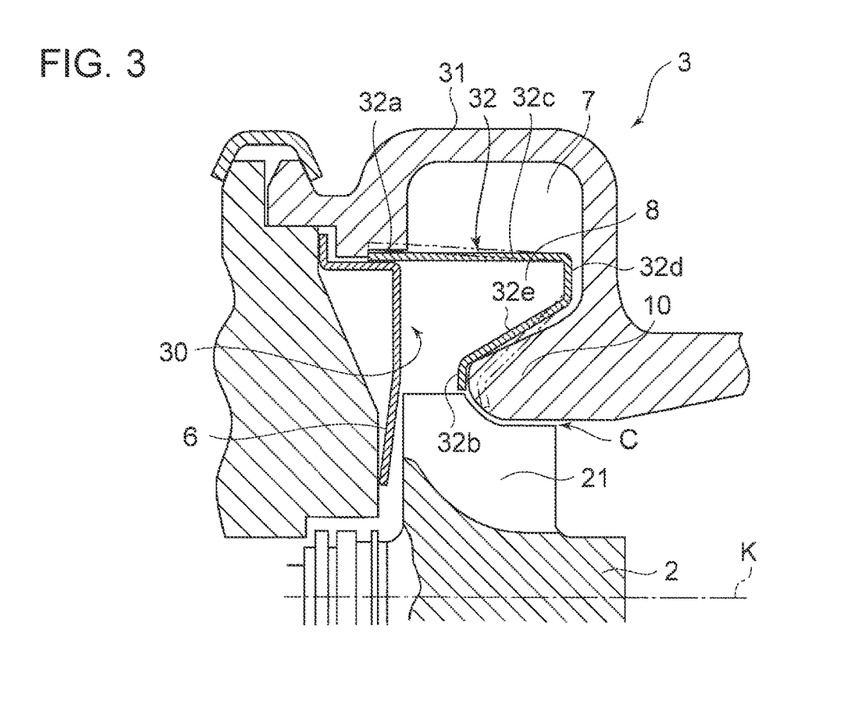
FIG. 3 is a cross-sectional view of a part of a turbocharger according to the second embodiment of the present invention.

FIG. 3 is an enlarged view of the turbine housing 3 of the turbocharger 1 according to the second embodiment of the present invention, where the reference numerals in FIG. 2 are similarly applied where appropriate.

In the following embodiment, components corresponding to those already described with reference to the preceding drawings are shown with the same reference numerals and not described again in detail. Instead, only different features will be described now in detail.

As illustrated in FIG. 3, also in the present embodiment, the interior member 32 includes the first end portion 32a to be engaged with an opening edge of the opening portion 30, and the second end portion 32b to be engaged with an end portion of an inner cylinder portion forming an inner peripheral part of the exterior member 31.

Further, the interior member 32 includes the first side 32c extending substantially parallel to the rotational axis K from the first end portion 32a, the second side 32d bended from the first side 32c substantially perpendicularly toward the turbine wheel 2 along the inner cylinder portion of the exterior member 31, and the third side 32e bended from the second side 32d so as to incline toward the opening portion 30 along the inner cylinder portion of the exterior member 31, the interior member 32 thereby having a substantially 7-shape in cross section. In addition, in the present embodiment, the interior member 32 is formed by bending so as to have resiliency.

Thus, the interior member 32 is inserted into the exterior member 31 from the opening portion 30 being open with the back plate 6 removed, while the interior member 32 is being deformed by a radially-inward bending stress during attachment or detachment of the interior member 32 to the exterior member 31. Then, a reaction force generated by removal of the bending stress biases the first end portion 32a to the opening edge of the opening portion 30 and the second end portion 32b to the edge portion of the inner cylinder portion forming an inner peripheral part of the exterior member 31, both outwardly, which is referred to as a spring-back effect, and thereby the interior member 32 is fitted inside the exterior member 31. Thus, bolts 9 (see FIG. 2) for fixing and mounting the interior member 32 inside the exterior member 31 are no longer needed.

As described above, according to the turbocharger 1 of the second embodiment, the interior member 32 is formed into a predetermined shape by bending, and a reaction force is generated by removal of the radially-inward bending stress during installation of the interior member 32 to the exterior member 31 to bias the first end portion 32a to the opening edge of the opening portion 30 and the second end portion 32b to the edge portion of the inner cylinder portion forming an inner peripheral part of the exterior member 31, both outwardly, which is referred to as a spring-back effect, and thereby the interior member 32 is fitted inside the exterior member 31. Thus, fastening members such as bolts 9 or the like for fixing are no longer required and it is possible to reduce the number of constituent parts, and to reduce cost. Further, using the bolts 9 of the turbocharger 1 in the above described first embodiment in combination makes it possible to fix the interior member 32 to the exterior member 31 firmly, and thus to improve mounting reliability considerably.

Third Embodiment

Figure 4:
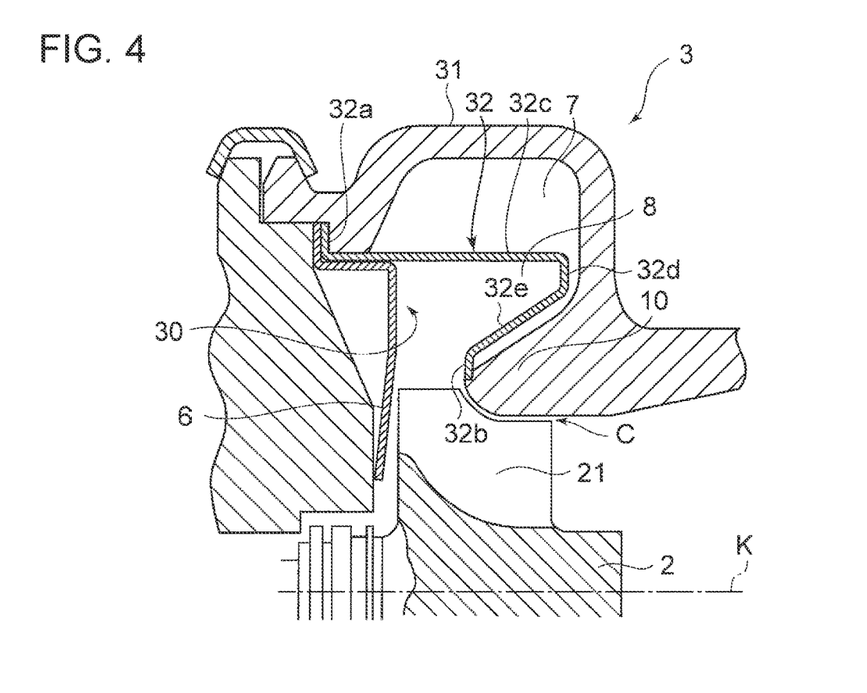
FIG. 4 is a cross-sectional view of a part of a turbocharger according to the third embodiment of the present invention.

FIG. 4 is an enlarged view of the turbine housing 3 of the turbocharger 1 according to the third embodiment of the present invention, where the reference numerals in FIGS. 2 and 3 are similarly applied where appropriate. As illustrated in FIG. 4, according to the present embodiment, the first end portion 32a of the interior member 32, disposed on the side of the opening portion 30 of the exterior member 31, is interposed between the back plate 6 and the exterior member 31.

Thus, it is possible to mount the interior member 32 to the exterior member 31 without a fastening member such as the bolt 9.

At this time, the second end portion 32b of the interior member 32 may be fixed to the edge portion of the inner cylinder portion forming an inner peripheral part of the exterior member 31 so as to be in contact with the edge portion, or may be fixed to the edge portion while being biased by a spring-back effect similarly to the interior member 32 in the above described second embodiment.

As described above, according to the turbocharger 1 of the third embodiment, the first end portion 32a of the interior member 32, disposed on the side of the opening portion 30 of the exterior member 31, is interposed between the back plate 6 and the exterior member 31. Thus, it is possible to mount the interior member 32 to the exterior member 31 without a fastening member such as the bolt 9, which makes it possible to reduce the number of constituent parts and to reduce cost. Further, using the above described bolts 9 and the spring-back effect in combination makes it possible to fix the interior member to the exterior member even more firmly, and thus to improve mounting reliability even further.

Fourth Embodiment

Figure 5:
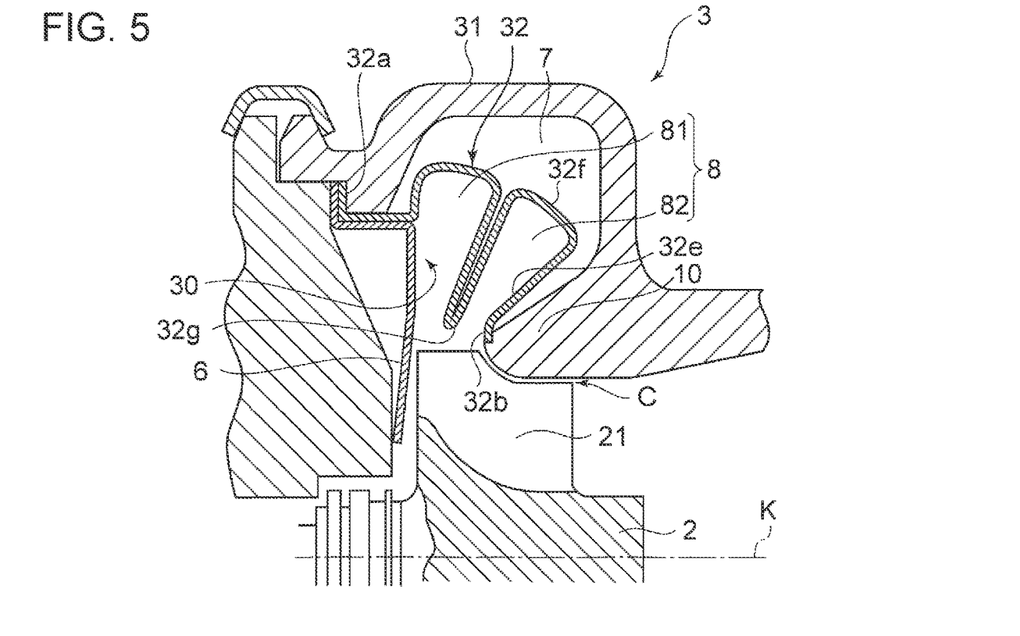
FIG. 5 is a cross-sectional view of a part of a turbocharger according to the fourth embodiment of the present invention.

FIG. 5 is an enlarged view of the turbine housing 3 of the turbocharger 1 according to the fourth embodiment of the present invention, where the reference numerals in FIG. 4 are similarly applied where appropriate.

As illustrated in FIG. 5, according to the present embodiment, the interior member 32 is formed by bending so as to have an outer circumferential side 32f, instead of the first side 32c, with a substantially-center portion 32g being formed to protrude toward the turbine wheel 2 side of the opening portion 30 of the exterior member 31. Accordingly, the interior member 32 forms the scroll part 8 having a plurality (in this case, two) of flow passages 81, 82 for exhaust gas G (in this case, the scroll part 8 comprises a so-called twin scroll).

As described above, with the interior member 32 including the scroll part 8 with a plurality (e.g. two) of flow passages 81, 82 for exhaust gas G, it is possible to reduce generation of a secondary flow in a swirl flow of exhaust gas G in the scroll part 8. Further, with the two flow passages 81, 82 for exhaust gas G, it is possible to utilize the scroll part 8 as a twin scroll.

As described above, according to the turbocharger 1 of the fourth embodiment, with the interior member 32 including the scroll part 8 bended to include the plurality of flow passages 81, 82 for exhaust gas G, it is possible to reduce generation of a secondary flow in a swirl flow of exhaust gas G in the scroll part 8, which makes it possible to improve performance of the turbocharger 1.

Further, with the two flow passages 81, 82 for exhaust gas G formed in the scroll part 8, it is possible to utilize the scroll part 8 as a twin scroll.

Fifth Embodiment

Figure 6:
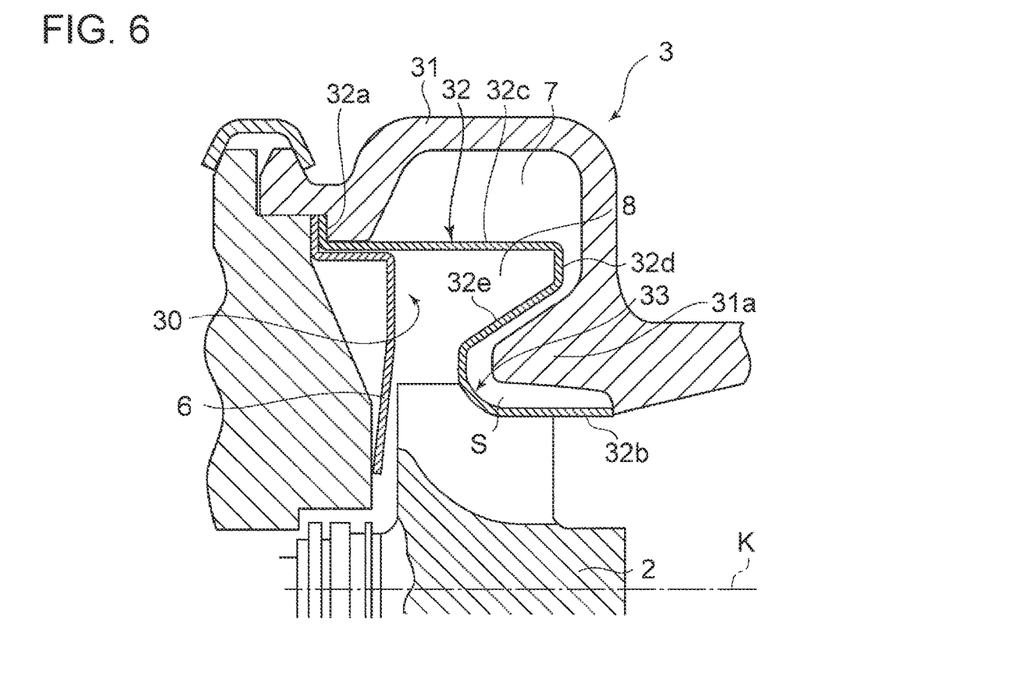
FIG. 6 is a cross-sectional view of a part of a turbocharger according to the fifth embodiment of the present invention.

FIG. 6 is an enlarged view of the turbine housing 3 of the turbocharger 1 according to the fifth embodiment of the present invention, where the reference numerals in FIG. 4 are similarly applied where appropriate. As illustrated in FIG. 6, in the present embodiment, the interior member 32 is extended from the scroll part 8 to form a shroud part 10 (see FIG. 4) formed so as to surround a rim portion of the turbine wheel 2, radially inside the turbine housing 3.

Specifically, according to the fifth embodiment, the interior member 32 includes the first end portion 32a being the first engaging portion to be engaged with the opening edge of the opening portion 30, and the second end portion 32b being the third engaging portion to be engaged with an inner peripheral portion of an inner cylinder portion forming an inner peripheral part of the exterior member 31. The second end portion 32b is extended from the third side 32e of the interior member 32 to the inner peripheral portion of the inner cylinder portion of the exterior member 31. Thus, the interior member 32 is extended from the third side 32e to integrally form a shroud part 33 extended from the scroll part 8.

Further, the shroud part 33 is formed of the interior member 32 of thin sheet metal composed of austenite heat-resistant stainless cast steel, so as to permit deformation of the turbine wheel 2. Further, a gap S extending from and communicating with the clearance part 7 is formed between the shroud part 33 and an inner-cylinder edge portion 31a of the exterior member 31 facing the shroud part 33.

Further, the first end portion 32a of the interior member 32 is interposed between the back plate 6 and the exterior member 31, and the second end portion 32b of the interior member 32 disposed at a downstream side of the first end portion 32a with respect to a flow of exhaust gas G is attached to the exterior member 31. Thus, the interior member 32 is attached to the exterior member 31 at the first end portion 32a and the second end portion 32b respectively extending from the scroll part 8 and the shroud part 33, so that the interior member 32 is spaced from the exterior member 31 via the clearance part 7 and the gap S, which allows the interior member 32 to deform thermally, either expand or contract, in accordance with exposure to high temperatures.

Thus, if the scroll part 8 and the shroud part 33 are similarly heated by exhaust gas G, the shroud part 33 thermally deforms outward from the scroll part 8 to perform outward thermal deformation to move away from the turbine wheel 2, which thermally deforms to get closer to the scroll part 8. In other words, the shroud part 33 can follow thermal deformation of the turbine blade part 21 of the turbine wheel 2. Thus, the shroud part 33 can effectively avoid contact with a rim portion of the turbine blade part 21 of the turbine wheel 2.

As described above, according to the turbocharger 1 of the fifth embodiment, the interior member 32 is extended from the scroll part 8 to form the shroud part 33 to cover a rim portion of the turbine blade part 21 of the turbine wheel 2, radially inside the turbine housing 3. Thus, the shroud part 33 is also composed of sheet metal, and it is possible to restrict a temperature rise of the exterior member 31 even further.

Normally, a certain clearance C (see FIG. 4, for instance) is required between the shroud part 10 and the turbine wheel 2 to reduce a risk of damage due to thermal deformation of the turbine blade part 21 caused by high-temperature exhaust gas G during an engine transient period. Conversely, in the present embodiment, the shroud part 33 can be formed of the interior member 32 capable of following thermal deformation of the turbine blade part 21, and thus it is possible to reduce a risk of damage due to contact of the turbine blade part 21 considerably, and to minimize the above described clearance C, which makes it possible to eliminate space that is unnecessary during normal operation, thereby reducing the size of the turbine housing 3 as a whole.

Figure 7:
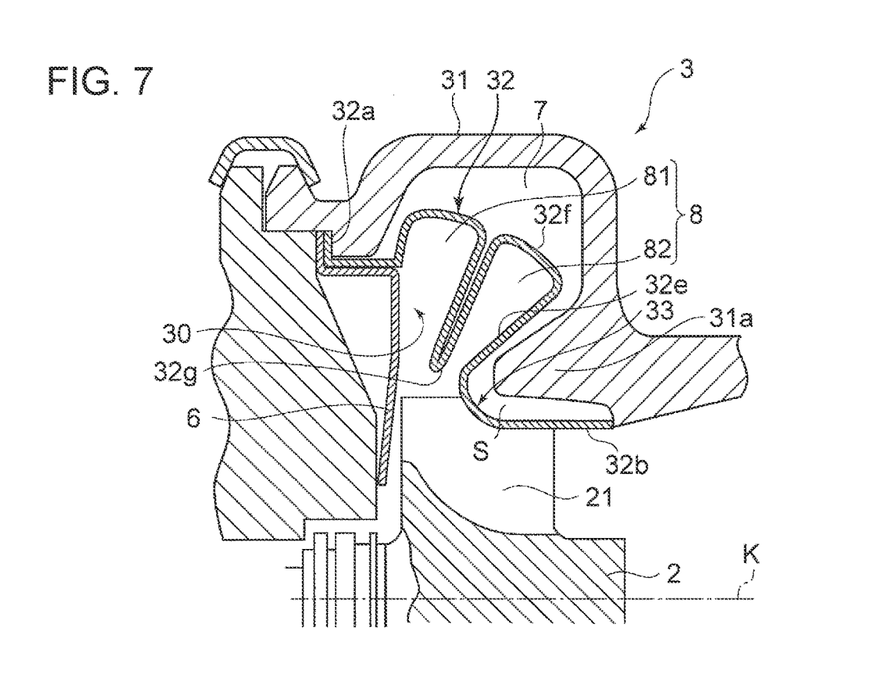
FIG. 7 is a cross-sectional view of a modified example of the turbocharger in FIG. 6.

In this case, as illustrated in FIG. 7 showing the same reference numerals as those in FIGS. 5 and 6 to indicate corresponding components, the interior member 32 integrating the shroud part 33 described above may include the outer circumferential side 32f instead of the first side 32c, the outer circumferential side 32f including the substantially-center portion 32g formed to protrude toward the turbine wheel 2 side of the opening portion 30 of the exterior member 31, so that the interior member 32 forms the scroll part 8 having the plurality of (in this case, two) flow passages 81, 82 for exhaust gas G (in this case, the scroll part 8 comprises a so-called twin scroll).

Accordingly, with the turbocharger 1 according to the above described first to fifth embodiments, it is possible to reduce loss of exhaust gas by improving surface roughness to improve efficiency of a turbocharger, and to reduce generation of a crack due to thermal fatigue to improve durability, and ensure rigidity to prevent exhaust-gas leakage to outside securely.

INDUSTRIAL APPLICABILITY

Accordingly to the present invention, it is possible to reduce loss of exhaust gas by improving surface roughness to improve efficiency of a turbocharger, while ensuring rigidity, and to reduce generation of a crack due to thermal fatigue to improve durability, as well as to prevent exhaust-gas leakage to outside securely, and thus the present invention can be suitably applied to a turbine housing of a turbocharger disposed in an exhaust system of, for instance, a vehicle, a ship, or an industrial machine such as a fixed engine.

DESCRIPTION OF REFERENCE NUMERALS

1 Turbocharger
2 Turbine wheel
21 Turbine blade part
3 Turbine housing
30 Opening portion
31 Exterior member
31a Inner-cylinder edge portion
32 Interior member
32a First end (first engaging portion)
32b Second end (second engaging portion, third engaging portion)
32c First side
32d Second side
32e Third side
32f Outer circumferential side
33 Shroud part
6 Back plate
7 Clearance part
8 Scroll part
81, 82 Flow passage
9 Bolt (fastening member)
C Clearance
G Exhaust gas
S Gap

The invention claimed is:
1. A turbine housing which accommodates a turbine wheel rotated by exhaust gas taken in from an engine and which includes a scroll part having a scroll shape and forming, on a radially-inner side, a flow passage for the exhaust gas, the turbine housing comprising:
   an exterior member formed by casting, the exterior member forming an opening portion inside which a back-face member is disposed so as to have a gap from a back-face side of the turbine wheel; and
   an interior member made of sheet metal, the interior member being disposed inside the exterior member via a predetermined clearance part from the exterior member and forming the scroll part,
   wherein the interior member is configured to be attachable and detachable with respect to the exterior member through the opening portion, and
   wherein the interior member includes
      a first engaging portion to be engaged with an opening edge of the opening portion, and
      a second engaging portion to be engaged with an edge portion of an inner cylinder portion forming an inner peripheral part of the exterior member.

2. The turbine housing according to claim 1,
wherein the interior member is mounted inside the exterior member via a fastening member.

3. The turbine housing according to claim 1,
wherein the interior member is bended into a predetermined shape, and
wherein, during attachment and detachment with respect to the exterior member, the interior member is configured to be fitted inside the exterior member by a spring-back effect to deform the interior member by a bending stress applied radially inward and bias the interior member outward by a reaction force generated by removal of the bending stress.

4. The turbine housing according to claim 1,
wherein the interior member comprises a first end portion disposed on an opening-portion side of the exterior member, the first end portion being interposed between the back-face member and the exterior member.

5. The turbine housing according to claim 1,
wherein the interior member comprises the scroll part, and the scroll part is bended to have a plurality of flow passages for the exhaust gas, the flow passages being aligned in a direction of a rotational axis of the turbine wheel.

6. The turbine housing according to claim 1,
wherein the interior member includes a shroud part formed so as to surround a rim portion of the turbine wheel, the shroud part being formed integrally with the interior member and extending from the scroll part.

7. The turbine housing according to claim 6,
wherein the interior member includes
a first engaging portion to be engaged with an opening edge of the opening portion, and
a third engaging portion to be engaged with an inner peripheral portion of an inner cylinder portion forming an inner peripheral part of the exterior member.

8. The turbine housing according to claim 1, wherein the exterior member is made of a material having lower heat resistance than the interior member.

9. The turbine housing according to claim 1, wherein the back-face member is made of sheet metal.

* * * * *